United States Patent [19]

Hashimoto et al.

[11] Patent Number: 5,060,615

[45] Date of Patent: Oct. 29, 1991

[54] KNOCK SENSING APPARATUS FOR AN INTERNAL COMBUSTION ENGINE

[75] Inventors: Atsuko Hashimoto; Toshio Iwata, both of Himeji, Japan

[73] Assignee: Mitsubishi Denki Kabushiki Kaisha, Tokyo, Japan

[21] Appl. No.: 600,931

[22] Filed: Oct. 22, 1990

[30] Foreign Application Priority Data

Oct. 24, 1989 [JP] Japan .................. 1-274902

[51] Int. Cl.⁵ .............................. F02D 1/00
[52] U.S. Cl. ............................ 123/425; 73/35
[58] Field of Search .............. 123/425, 435; 364/431.08; 73/35

[56] References Cited

U.S. PATENT DOCUMENTS

| | | | |
|---|---|---|---|
| 4,343,278 | 8/1982 | Asano | 123/435 |
| 4,454,750 | 6/1984 | Yoshida et al. | 73/35 |
| 4,501,137 | 2/1985 | Aoki et al. | 73/35 |
| 4,558,674 | 12/1985 | Okado et al. | 123/425 |
| 4,766,545 | 8/1988 | Nagai | 123/425 |

FOREIGN PATENT DOCUMENTS 0257041 11/1987 Japan .................. 73/35

Primary Examiner—Tony M. Argenbright
Assistant Examiner—Robert E. Mates
Attorney, Agent, or Firm—Sughrue, Mion, Zinn, Macpeak and Seas

[57] ABSTRACT

A knock sensing apparatus for a multi-cylinder internal combustion engine has a knock sensor that generates an electrical output signal corresponding to vibrations of the engine. A level indicating means generates a first level signal indicating the level of the output signal of the knock sensor during a first period at least partially coinciding with the power stroke in a cylinder of the engine and a second level signal indicating the level of the output signal of the knock sensor during a second period. An averager forms an average of the second level signal over a prescribed period, and a threshold calculator calculates a threshold based on the average. A comparator compares the first level signal and the threshold and generates a signal indicating knocking when the first level signal exceeds the threshold.

8 Claims, 3 Drawing Sheets

KNOCK SENSING APPARATUS FOR AN INTERNAL COMBUSTION ENGINE

BACKGROUND OF THE INVENTION

This invention relates to a knock sensing apparatus for an internal combustion engine. More particularly, it relates to a knock sensing apparatus equipped with a fail-safe mechanism that ensures that the engine operates in a knock-free region even when a knock sensor of the knock sensing apparatus malfunctions.

Engine knocking is a form of engine vibration that occurs due to improper combustion in the cylinders of an engine. Prolonged knocking can damage an engine, so many engines are equipped with a knock sensing apparatus that senses engine vibrations and distinguishes vibrations due to knocking from other vibrations. When knocking is sensed, an operating parameter of the engine is adjusted so as to suppress the knocking. The most common method of suppressing knocking is to retard the ignition timing of the engine to the point that knocking no longer occurs.

A typical knock sensing apparatus includes a knock sensor in the form of an acceleration sensor that is mounted on the engine and generates an electrical output signal in response to engine vibrations. The output signal of the knock sensor is processed to separate components of the signal due to knocking from components due to miscellaneous mechanical vibrations and electrical noise. The ignition timing of the engine is then retarded until signal components due to knocking can no longer be detected.

The signal processing that must be performed on the output signal of the knock sensor is complicated, so a conventional knock sensing apparatus employs a considerable number of discrete electronic hardware components for carrying out the signal processing. The large number of components makes a conventional knock sensing apparatus bulky, and because of the labor required to assemble the components, the manufacturing costs are high. Furthermore, the characteristics of the individual hardware components of a conventional knock sensing apparatus can not be easily or widely adjusted, so the degree of freedom of control of the knock sensing apparatus is limited.

SUMMARY OF THE INVENTION

Accordingly, it is an object of the present invention to provide a knock sensing apparatus for an internal combustion engine that employs fewer hardware components than a conventional knock sensing apparatus and permits greater freedom of control.

It is another object of the present invention to provide a knock sensing apparatus that can automatically sense the failure of a knock sensor of the apparatus.

It is yet another object of the present invention to provide a failure sensing method for a knock sensing apparatus.

A knock sensing apparatus for a multi-cylinder internal combustion engine according to the present invention has a knock sensor that generates an electrical output signal corresponding to vibrations of the engine. A level indicating means generates a first level signal indicating the level of the output signal of the knock sensor during a first period at least partially coinciding with the power stroke of a cylinder of the engine and a second level signal indicating the level of the output signal of the knock sensor during a second period. An averaging means forms an average of the second level signal over a prescribed period, and a threshold calculator calculates a threshold based on the average. A comparing means compares the first level signal and the threshold and generates a signal indicating knocking when the first level signal exceeds the threshold.

The present invention may further comprise a failure sensing means for sensing a failure of the knock sensor. The failure sensing means compares an average of the first and second level signals with a prescribed value. When the average is less than the prescribed value for more than a prescribed period, it is determined that the knock sensor has failed.

DESCRIPTION OF THE PREFERRED EMBODIMENTS

Figure 1:
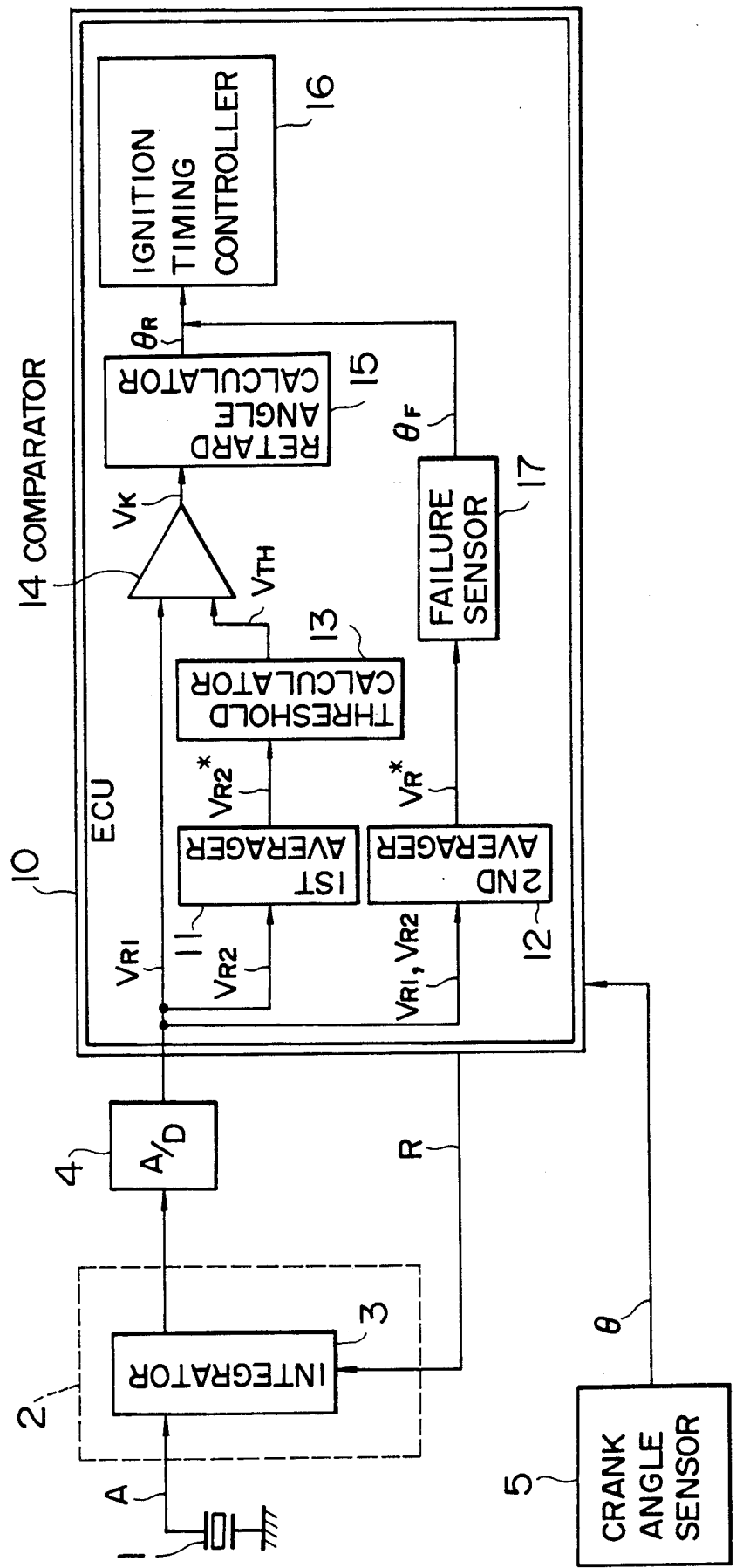
FIG. 1 is a block diagram conceptually illustrating an embodiment of a knock sensing apparatus according to the present invention.
Figure 2:
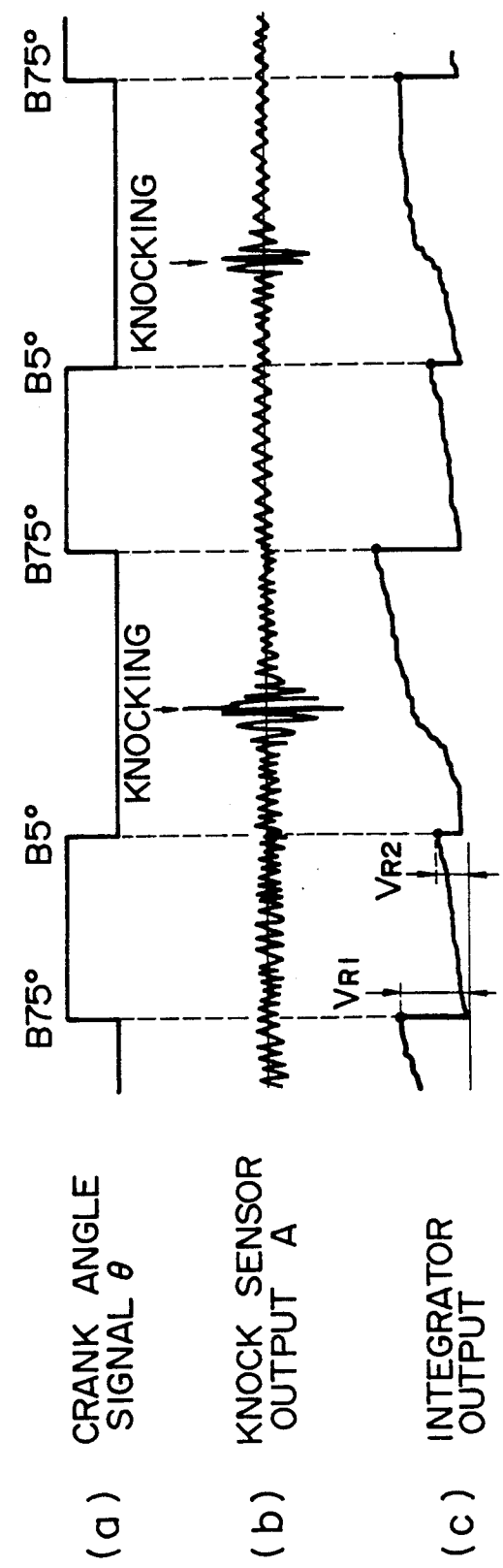
FIGS. 2(a–c) are wave form diagrams showing the crank angle signal, the knock sensor output signal, and the integrator output signals for the embodiment of FIG. 1.

FIG. 1 conceptually illustrates an embodiment of a knock sensing apparatus according to the present invention. As shown in this figure, a conventional knock sensor 1 is mounted on a suitable portion of an unillustrated multi-cylinder internal combustion engine. Although a plurality of knock sensors 1 can be used to detect vibrations of individual cylinders of the engine, for simplicity, the case will be described in which a single knock sensor 1 is employed to detect vibrations of all the cylinders. The mounting location of the knock sensor 1 on the engine will depend on the structure of the engine but should be a location where engine vibrations can be easily picked up. The knock sensor 1 is an accelerometer, such as one using a piezo-electric element, that when vibrated generates an electrical output signal having a magnitude corresponding to the strength of the vibrations. Line (b) of FIG. 2 illustrates an example of the output signal A of the knock sensor 1. The engine is always producing vibrations, so even when knocking is not taking place, the output signal A of the knock sensor 1 includes low-amplitude oscillations due to normal engine mechanical vibrations and electrical noise. However, when knocking occurs, the amplitude of the output signal A sharply increases. Knocking is produced by combustion in the cylinders of an engine, so the large-amplitude oscillations of the output signal A due to knocking generally take place when the position of the piston in a cylinder in which knocking is occurring is in the range of 10–60 degrees after top dead center (ATDC). The output signal A of the knock sensor 1 is input to an interface 2 comprising an integrator 3 that integrates the output signal A over time and generates a corresponding level signal indicative of the level of the output signal A. The level signal is converted into a digital signal by an A/D converter 4.

A crank angle sensor 5 senses the rotation of some portion of the engine (generally the crankshaft or the camshaft) and generates a crank angle signal $\theta$ that changes in value each time one of the pistons of the engine is at a prescribed position with respect to top dead center (TDC). Line (a) of FIG. 2 illustrates an example of the crank angle signal $\theta$. It is in the form of pulses having a rising edge each time one of the pistons of the engine is at a first piston position (75 degrees before top dead center (BTDC), for example) and a falling edge each time one of the pistons is at a second piston position (5 degrees BTDC, for example). Crank angle sensors for generating this type of output signal are well known to those skilled in the art, and any suitable type can be employed.

The crank angle signal $\theta$ is input to an electronic control unit (ECU) 10, which generates a reset signal R that resets the integrator 3 each time a rising edge or a falling edge of the crank angle signal $\theta$ occurs. Each time the integrator 3 is reset, the output of the A/D converter 4, i.e., the digitalized level signal from the integrator 3, is sampled by the ECU 10. The level signal of the integrator 3 at the first piston position will be referred to as a first level signal $V_{R1}$, and the level signal at the second piston position will be referred to as a second level signal $V_{R2}$.

The ECU 10 includes a first averager 11 that calculates an average $V_{R2}^*$ of the second level signal $V_{R2}$ from the integrator 3 over a prescribed period of time and generates a corresponding output signal, and a second averager 12 that calculates an average $V_R^*$ of the first and second level signals $V_{R1}$ and $V_{R2}$ from the integrator 3 over a prescribed period of time and generates a corresponding output signal. In the present embodiment, the average calculated by each averager 11 and 12 is not a strict mathematical mean of the output signals $V_{R1}$ or $V_{R2}$ but is a "running average", which is a weighted average of the most recent value of the level signal and a previously-calculated value of the average. This value closely approximates the exact mathematical mean over a prescribed period. For example, the average $V_{R2}^*$ can be calculated by the formula:

$$V_{R2}^*(n) = 31/32 \times V_{R2}^*(n-1) + 1/32 \times V_{R2}(n) \tag{1}$$

wherein:

$V_{R2}^*(n)$ is the average now being calculated at the most recent occurrence of the second level signal $V_{R2}$, $V_{R2}^*(n-1)$ is the average calculated at the previous occurrence of the second level signal $V_{R2}$, and $V_{R2}(n)$ is the most recent value of the second level signal $V_{R2}$.

Similarly, the average $V_R^*$ can be calculated by the formula:

$$V_R^*(n) = 63/64 \times V_R^*(n-1) + 1/64 \times B \tag{2}$$

wherein:

$V_R^*(n)$ is the average now being calculated at the most recent occurrence of the first or second level signal $V_{R1}$ or $V_{R2}$, $V_R^*(n-1)$ is the average calculated at the previous occurrence of the first or second level signal $V_{R1}$ or $V_{R2}$, and B is the first level signal $V_{R1}$ when the position of any piston is 75 degrees BTDC and is the second level signal $V_{R2}$ when the position of any piston is 5 degrees BTDC.

In this example, $V_{R2}^*$ is calculated each time any piston of the engine is at the second piston position (5 degrees BTDC), and $V_R^*$ is calculated each time any piston of the engine is at either the first piston position (75 degrees BTDC) or the second piston position (5 degrees BTDC). In a four-cylinder engine, $V_{R2}^*$ will be calculated 2 times per rotation of the crankshaft, so the value of $V_{R2}^*$ approximates the average of $V_{R2}$ over 16 rotations (32 divided by 2) of the crankshaft. Similarly, in a four-cylinder engine, $V_R^*$ is calculated four times per crankshaft rotation, so $V_R^*$ approximates the average of $V_{R1}$ and $V_{R2}$ over 16 rotations (64 divided by 4) of the crankshaft. However, the averages $V_{R2}^*$ and $V_R^*$ can be calculated over any desired number of crankshaft rotations.

During the period for which the second level signal $V_{R2}$ is calculated (75 BTDC to 5 BTDC), no cylinder of the engine is in its power stroke, so no knocking is taking place at this time. Therefore, average $V_{R2}^*$ is indicative of the level of the knock sensor output signal A in the absence of knocking. The output signal from the first averager 11 corresponding to average $V_{R2}^*$ is provided to a threshold calculator 13, which calculates a threshold voltage $V_{TH}$ for comparison with the first level signal $V_{R1}$. The threshold voltage $V_{TH}$ and the first level signal $V_{R1}$ are input to a comparator 14 that generates an output signal $V_K$ that changes in value when the first level signal $V_{R1}$ exceeds the threshold voltage $V_{TH}$. For example, in the present embodiment, the output signal $V_K$ has a high level when $V_{R1} > V_{TH}$ and a low level at other times. The threshold voltage $V_{TH}$ should be sufficiently large that small variations in the first level signal $V_{R1}$ due to mechanical or electrical noise will not be mistaken for variations due to knocking. In the present embodiment, the threshold voltage $V_{TH}$ is calculated by the formula $$V_{TH} = V_{R2}^* \times K + V_{off} \tag{3}$$

wherein K is an amplification factor and $V_{off}$ is an offset voltage.

The threshold $V_{TH}$ is calculated based on the average $V_{R2}^*$ instead of the second level signal $V_{R2}$ because the latter can vary a great deal from cylinder to cylinder and between rotations of the crankshaft, so the average $V_{R2}^*$ taken over a plurality of crankshaft rotations is a better indicator of the level of the knock sensor output signal in the absence of knocking.

The output $V_K$ of the comparator 14 is input to a retard angle calculator 15 that calculates a retard angle $\theta_R$ and generates a corresponding output signal for input to an ignition timing controller 16. The retard angle $\theta_R$ is the angle by which the ignition timing of the engine is retarded with respect to a basic ignition timing, which is the ignition timing for best efficiency in the absence of knocking given the present engine operating conditions. The basic ignition timing is calculated by the ignition timing controller 16 based on various engine operating parameters, such as the engine load or engine rotational speed. These operating parameters are determined based on input signals from various sensors, such as the crank angle sensor 5 or an unillustrated air flow sensor for sensing the air intake rate into the engine. Algorithms that can be used by the ignition timing controller 16 for calculating the basic ignition timing are well-known to those skilled in the art. After determining the basic ignition timing, the ignition timing controller 16 calculates a corrected ignition timing by subtracting the retard angle $\theta_R$ from the basic ignition timing. It then uses the corrected ignition timing to control the timing with which the unillustrated spark plugs of the engine are fired.

The retard angle calculator 15 changes the retard angle $\theta_R$ incrementally. When the comparator output $V_K$ has a high level, the retard angle calculator 15 increases the retard angle $\theta_R$ in a step-wise manner at prescribed intervals, such as each time the first level signal $V_{R1}$ is generated. When knocking stops taking place and the comparator output $V_K$ returns to a low level, after a prescribed length of time has elapsed, the retard angle calculator 15 reduces the retard angle $\theta_R$ back towards 0 in a step-wise manner. By the repeated adjustment of the retard angle $\theta_R$, the engine is operated as close as possible to the basic ignition timing for best efficiency without knocking taking place.

The output signal of the comparator 14 has only a high or a low level, so it can indicate the occurrence of knocking but not the amount of knocking. The comparator 14 could be replaced by a differential amplifier that generated a signal corresponding to the magnitude of the difference between the first level signal $V_{R1}$ and the threshold $V_{TH}$. This output signal would indicate not only the occurrence of knocking but also the amount of knocking. The retard angle calculator 15 could then adjust the retard angle $\theta_R$ based on the magnitude of the output signal from the differential amplifier. Such an arrangement would have a quicker response than the arrangement shown in FIG. 1.

If the knock sensor 1 fails and stops producing an output signal or produces one having an extremely low level not accurately indicating the level of engine vibrations, accurate knock sensing becomes impossible. In this case, the retard angle calculator 15 may not generate angle $\theta_R$, and the engine may operate at the basic ignition timing, even when knocking is taking place. Therefore, to prevent damage to the engine due to knocking, it is important to be able to sense failure of the knock sensor 1, and when failure is sensed, to retard the ignition timing by an amount sufficient to prevent knocking. For this reason, the ECU 10 of this embodiment includes a failure sensor 17 that receives the output signal of the second averager 12 indicating the average $V_R^*$ of the first level signal $V_{R1}$ and the second level signal $V_{R2}$. On the basis of the level of the average $V_R^*$, the failure sensor 17 determines whether the knock sensor 1 is operating properly. When the failure sensor 17 detects a failure of the knock sensor 1, it generates a failure retard angle $\theta_F$ which at this time only is used as a retard angle instead of the usual retard angle $\theta_R$ from the retard angle calculator 15. The failure retard angle $\theta_F$ is large enough so that knocking will not occur.

The failure sensor 17 determines that the knock sensor 1 has failed when the average $V_R^*$ calculated by the second averager 12 is less than a predetermined value for more than a prescribed period. Since the amplitude of the output signal of the knock sensor 1 generally increases as the engine rotational speed increases, at low rotational speeds, the average $V_R^*$ may be less than the predetermined value even though the knock sensor 1 is operating normally. Therefore, failure sensing is only performed when the engine rotational speed is above a certain level.

It is possible for the ECU 10 to comprise a plurality of discrete electronic components corresponding to elements 11-17 connected with one another as shown by FIG. 1. Preferably, however, the ECU 10 comprises a microcomputer having a CPU that performs the functions of elements 11-17 by means of software. Most modern engines are already equipped with a microcomputer for controlling ignition timing, fuel injection, and various other facets of engine operation. An existing microcomputer for an engine can be adapted to perform the functions of the ECU 10 of FIG. 1 simply by altering the programs executed by the microcomputer.

Therefore, since the ECU 10 can comprise a microcomputer, a knock sensing apparatus according to the present invention can be manufactured using a very small number of hardware components. As a result, hardware costs and assembly costs are low, and a small-sized apparatus can be achieved. Furthermore, since the functions of the ECU 10 can be performed by software, variations in the manner of operation of the ECU 10 can be easily effected by simply changing the software. This permits great freedom of control by the ECU 10.

Figure 3:
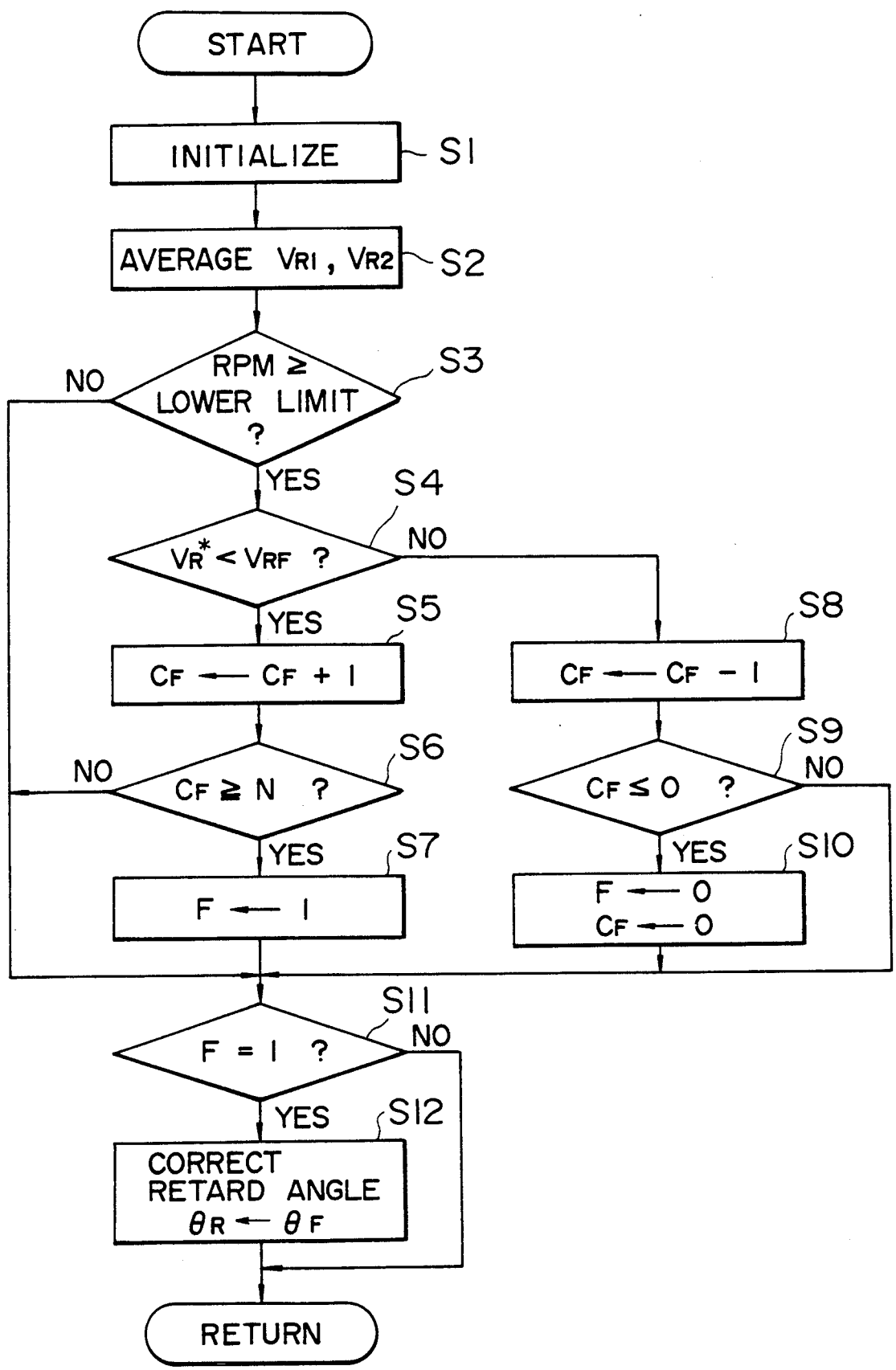
FIG. 3 is a flow chart of a failure sensing method according to the present invention.

FIG. 3 is a flow chart of an example of a program that can be used by the ECU 10 to carry out failure sensing. In Step S1, initialization of various constants employed in the program is performed. In particular, a counter CF and a failure flag F are both made equal to 0. In Step S2, the second averager 12 calculates the average $V_R^*$ of the first and second level signals $V_{R1}$ and $V_{R2}$ from the integrator 3. In Step S3, the ECU 10 calculates the engine rotational speed based on the crank angle signal $\theta$ from the crank angle sensor 5 and determines whether the rotational speed is high enough to perform failure sensing by comparing the rotational speed with a prescribed value. If the rotational speed is too low to perform failure sensing, the program jumps to Step S11, while if the rotational speed is high enough, in Step S4, the failure sensor 17 compares average $V_R^*$ with a reference value $V_{RF}$. If average $V_R^*$ is less than the reference value $V_{RF}$, then in Step S5, a counter CF is incremented. In Step S6, counter CF is compared with a constant N. If CF is greater than or equal to N, it is determined that the knock sensor 1 is malfunctioning, so in Step S7, a failure flag F that indicates failure of the knock sensor 1 is set equal to 1.

If in Step S4 is it determined that average $V_R^*$ is greater than or equal to the reference value $V_{RF}$, then in Step S8, the counter CF is decremented by 1. Next, in Step S9, the counter CF is compared with 0. If the counter CF has a value of 0 or less, it is determined that the knock sensor 1 is normal (or has stopped malfunctioning), so in Step S10, the failure flag F is cleared (set equal to 0) and the counter CF is set equal to 0.

After Step S7 or Step S10 is performed, in Step S11, it is determined whether the failure flag F is set, i.e., equal to 1. If it is, then in Step S12, the retard angle $\theta_R$ calculated by the retard angle calculator 15 is replaced by the failure retard angle $\theta_F$, after which a return is performed. If the failure flag F is not set, then a return is performed directly after Step S11.

The counter CF indicates the difference between the number of iterations of the program of FIG. 3 for which $V_R^* < V_{RF}$ and the number of iterations for which $V_R^* \geq V_{RF}$ since the last time that the failure flag F was cleared. In other words, if $CF \geq N$, then $V_R^* > V_{RF}$ for at least N iterations of the program since the failure flag F was last cleared. A failure is determined only when $CF \geq N$ instead of each time that $V_R^* < V_{RF}$, since it is possible for $V_R^*$ to momentarily fall below $V_{RF}$ without the knock sensor 1 actually having failed. By determining that the knock sensor has failed only when $CF \geq N$, the reliability of failure sensing is increased.

The program of FIG. 3 can be performed as frequently as desired. For example, it can be performed each time the average $V_R^*$ is calculated (at each occurrence of the first or second piston positions), or at less frequent intervals. By means of the program of FIG. 3, failure of the knock sensor 1 can be automatically sensed and the ignition timing can be adjusted to a value so as to prevent knocking.

In the embodiment of FIG. 1, an integrator 3 is used to generate a level signal indicative of the level of the output signal A of the knock sensor 1 during a prescribed period. However, other means can be employed to generate a level signal. For example, the integrator 3 could be replaced by a peak hold circuit connected between the knock sensor 1 and the A/D converter 4. The peak hold circuit would generate level signals corresponding to the peak value of the knock sensor 1 during a prescribed period of crankshaft rotation.

As mentioned above, a knock sensing apparatus according to the present invention can employ more than a single knock sensor 1. For example, a separate knock sensor 1 can be mounted on each cylinder of an engine. Alternatively, if the cylinders are divided into banks, a separate knock sensor 1 can be mounted on each bank.

What is claimed is:

1. A knock sensing apparatus for a multi-cylinder internal combustion engine, comprising:
   a knock sensor for generating an electrical output signal corresponding to vibrations of an engine;
   level indicating means responsive to the knock sensor output signal for generating a first level signal indicating the level of the output signal of the knock sensor during a first time period at least partially coinciding with a power stroke of a cylinder of the engine and a second level signal indicating the level of the output signal of the knock sensor during a second time period not coinciding with a power stroke of a cylinder;
   first averaging means responsive to the level indicating means for forming a first average of the second level signal;
   threshold calculating means responsive to the first averaging means for calculating a threshold based on the first average; and
   comparing means for comparing the first level signal and the threshold and generating a signal indicating knocking when the first level signal exceeds the threshold.

2. A knock sensing apparatus as claimed in claim 1, wherein the level indicating means comprises an integrator that integrates the output signal of the knock sensor over the first and second time periods and generates level signals indicating the integrated value of the knock sensor output signal during each period.

3. A knock sensing apparatus as claimed in claim 1, wherein the level indicating means comprises a peak hold circuit that generates level signals indicating the peak level of the output signal of the knock sensor during each period.

4. A knock sensing apparatus as claimed in claim 1, further comprising:
   second averaging means for forming a second average of at least one of the level signals; and
   failure sensing means responsive to the second averaging means for generating a signal indicating failure of the knock sensor when the second average is below a prescribed level for a prescribed period of time.

5. A knock sensing method for a multi-cylinder internal combustion engine comprising:
   sensing vibrations of an engine with a knock sensor and generating an output signal indicative of the sensed vibrations;
   generating, from said output signal, a first level signal and a second level signal indicative of the level of the output signal of the knock sensor during a first time period and a second time period, respectively, the first time period at least partially coinciding with a power stroke of a cylinder of the engine and the second time period not coinciding with a power stroke of a cylinder;
   forming a first average of the second level signal;
   calculating a threshold based on the first average; and
   comparing the first level signal with the threshold and determining that the engine is knocking when the first level signal exceeds the threshold.

6. A method as claimed in claim 5, further comprising retarding the ignition timing of the engine when it is determined that the engine is knocking.

7. A method as claimed in claim 5 further comprising:
   forming a second average of the first and second level signals; and
   determining that the knock sensor has failed when the second average is less than a prescribed level for a prescribed period of time.

8. A method as claimed in claim 7, further comprising retarding the ignition timing of the engine by a failure retard angle when it is determined that the knock sensor has failed, both when it is determined that the engine is knocking and when no knocking has been determined.

* * * * *